Figure 1:
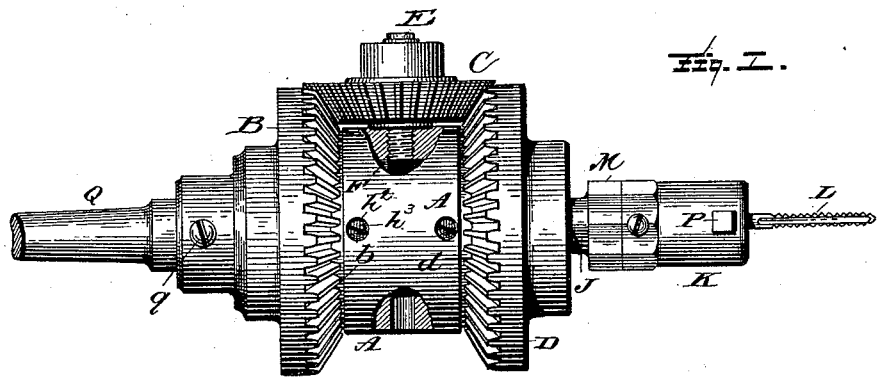

(No Model.)

H. B. PULLMAN.
TAPPING DEVICE.

No. 461,800. Patented Oct. 20, 1891.

Witnesses
L. C. Hills.
H. Sutherland.

Inventor:
Harry B. Pullman,
By his Attorney
E. H. Bond.

UNITED STATES PATENT OFFICE.

HARRY B. PULLMAN, OF CAMBRIDGE, OHIO, ASSIGNOR OF ONE-HALF TO JAMES WOLSTENCROFT, OF PHILADELPHIA, PENNSYLVANIA.

TAPPING DEVICE.

SPECIFICATION forming part of Letters Patent No. 461,800, dated October 20, 1891.

Application filed April 7, 1890. Renewed September 26, 1891. Serial No. 406,905. (No model.)

*To all whom it may concern:*

Be it known that I, HARRY B. PULLMAN, a citizen of the United States, residing at Cambridge, in the county of Guernsey and State of Ohio, have invented certain new and useful Improvements in Tapping Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to provide a tool that can be readily applied to a lathe or other speed-machine, and which will displace the ordinary screw-tapping machine run by an open and a crossed belt to give opposite motions to the tap, as when advancing or backing from the work, thereby obviating the purchase of a special machine for light work, such as tapping from one-sixteenth to seven-sixteenths, more or less. This tool precludes the necessity of stopping the machine to reverse its motion when it is desired to withdraw the tap from the work after the cutting of the thread, and can be attached to or disconnected from the speed-machine at a moment's notice, thereby leaving the said machine free for the performance of other work.

The improvement consists of two oppositely-revolving heads and a tap-holder adapted to be thrown in gear with one or the other of said heads, according as it is required to turn the tap either to the right or the left.

The improvement further consists in the instrumentalities for holding the several elements of the tool in their relative position, which will be hereinafter more fully described, shown in the drawings, and then specifically pointed out in the appended claims.

The invention is clearly illustrated in the accompanying drawings, which, with the letters of reference marked thereon, form a part of this specification, and in which—

Figure 2:
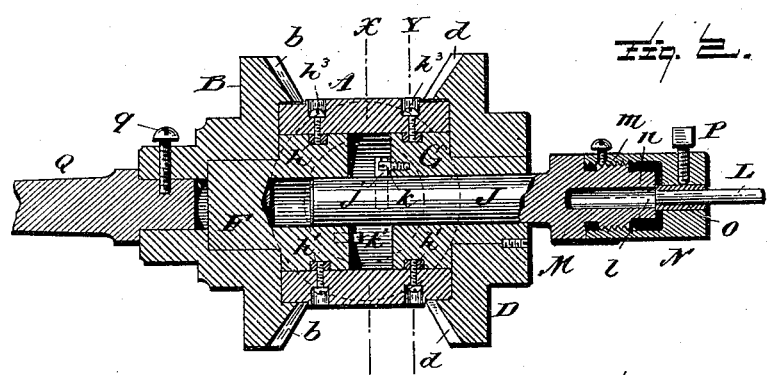
Figures 3, 4:
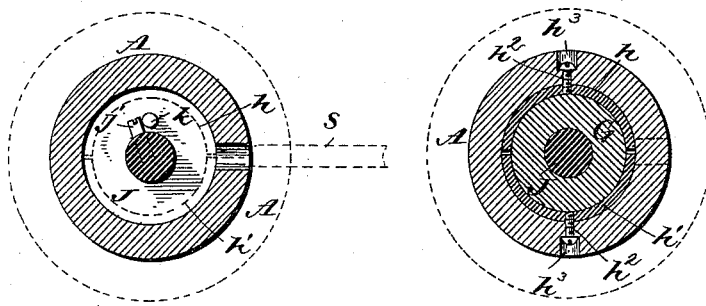

Figure 1 is a side elevation, parts being broken away, of a tool embodying my invention. Fig. 2 is a central longitudinal section of the tool. Fig. 3 is a cross-section on the line $x\ x$ of Fig. 2, looking to the right. Fig. 4 is a cross-section on the line $y\ y$ of Fig. 2.

Like letters of reference indicate like parts throughout the several views.

The head or frame A for supporting the operating parts of the tool may be of any desired shape which will not impede the free movements of the several running elements, but is preferably of the form shown, which is a cylinder, as it can be finished cheaply and is compact, occupying a minimum amount of room, and besides is best adapted to form bearings for the revolving heads B and D, which are journaled at the ends of the said frame. These heads B and D are connected by suitable mechanism, so as to revolve in opposite directions, the simplest form being that shown, which is an idle miter-wheel C, mounted on a stub-shaft E, let in the side of the frame, meshing with miter crown-gears $b$ and $d$, provided on the said heads B and D, respectively.

The miter crown-gears $b$ and $d$ overlap or embrace the ends of the frame and obtain a bearing thereon, and bosses F and G, projecting from the opposite sides of the said heads B and D, fit in the ends of said frame and form additional bearings for the aforesaid heads. Obviously the outer or inner bearings may be dispensed with and other forms of bearing between the said heads and the frame may be provided; but the construction shown is the preferable form, as it gives a double bearing—an inner and an outer one—to each head. The heads are held to the frame by screw-rings $h\ h'$, which are fitted in grooves H in the bosses F and G and by screws $h^2$, which pass through openings $h^3$ in the frame and screw into the parts of the ring. The openings $h^3$ are countersunk, so that the heads of the screws $h^2$ will not project beyond the surface of the frame.

The tap-holder J is journaled in the head D, and to obtain an increased bearing therefor its inner end extends into the head B. This holder has a limited longitudinal movement in the head to bring a stop $j$ thereon in engagement with a corresponding stop $k$ or $k'$ on the heads B and D, respectively, to effect a gearing between the said holder and either of the heads. The outer end of the holder J is provided with a suitable tap-holding chuck K, or is otherwise constructed to receive a chuck of ordinary construction. The holder has a bore $l$ in its outer end to receive the shank of the tap L, and is provided with the polygonal head M to receive a wrench (not shown) and with a threaded portion $m$ and plain and reduced end $n$, whereby it is adapted to receive various types of chucks, the plain end adapting it for the attachment of the well-known spring-chuck.

The form of chuck shown consists of a sleeve N, screwed on the end of the holder J, split spring-sleeve O, set in the reduced end of the sleeve N, and the binding-screw P for compressing the sleeve O.

The operation of the invention is as follows: The tool is applied to any speed machine or lathe by means of the shank Q, which is fitted to the head or mandrel of the said machine in any desired manner, the frame being held stationary by any suitable means, as by the rod S, (shown by dotted lines in Fig. 3,) which is inserted in an opening in the side of the frame, the outer end of the said rod being engaged with the bed plate or rest of the lathe or machine to which the tool is applied. The shank Q being held fast to the head B by means of a screw $q$ causes said head to turn with it, motion being transmitted to the head D through the intervention of the idle gear-wheel C, as hereinbefore specified. When the work is pressed against the tap, the holder J will be pressed in and the stop $j$ will engage with the stop $k'$ and cause the holder to gear and revolve with the said head B. When the thread is cut and it is desired to withdraw the tap from the work, the holder J is pulled out until the stop $j$ is disengaged from the stop $k'$ and engaged with the stop $k$, thereby effecting a gearing of the holder with the head D. Inasmuch as the head D is revolved in an opposite direction from the head B, obviously the tap will receive a reverse motion and back out from the work.

Various modifications in detail may be resorted to without departing from the spirit of the invention; but that above described is what I at the present time consider the preferable form.

What I claim as new is—

1. The hereinbefore-described tool for the purposes specified, comprising a frame, two oppositely-revolving heads, and a tap-holder adapted to gear with one or the other of the said heads, substantially as and for the purpose set forth.

2. A tapping-tool comprising a frame, two oppositely-revolving heads having crown-gear, an intervening gear-wheel meshing with the crown-gear on the said heads, and a tap-holder constructed to gear with either of the said heads, substantially as described, and for the purpose specified.

3. The combination, with the frame and the oppositely-revolving heads journaled on the ends of the frame, of the tap-holder journaled in one of the heads and adapted to have a longitudinal movement in the said head to effect a gearing of the said holder with either of the heads, substantially as set forth.

4. The combination, with the frame and the oppositely-revolving heads having crown-gear which embraces the ends of the said frame, of the gear-wheel C, journaled on the frame and meshing with the crown-gear on the said heads, and the tap-holder adapted to gear with either of the said heads, substantially as set forth.

5. The combination, with the frame, of the oppositely-revolving heads having bosses which fit within the ends of the frame and form journals for the said heads, and the tap-holder adapted to gear with either of the said heads, substantially as specified.

6. The combination, with the frame, of the oppositely-revolving heads having crown-gear which embraces the ends of the frame and having bosses which fit within the ends of the frame for the purpose described, and the tap-holder constructed to gear with either of the said heads, substantially as and for the purpose specified.

7. The combination, with the frame and the revolving heads having bosses which enter the ends of the frame and form bearings for the said heads, of rings fitted in grooves provided between the opposing sides of the frame and the bosses, and a fastening device, as the screws, for securing the said rings in place in the grooves, substantially as described.

8. The combination, with the frame and the revolving heads having bosses which fit within the ends of the frame and form bearings, of the severed rings fitted in grooves between the frame and bosses, and fastening devices for securing the severed rings in the said grooves, substantially as described.

9. The herein-described tap-holder having a threaded portion near one end and having said end reduced and plain, substantially as and for the purpose specified.

In testimony whereof I affix my signature in presence of two witnesses.

HARRY B. PULLMAN.

Witnesses:
J. M. OGIER,
JNO. L. LOCKE.